June 6, 1933.    J. BETHENOD    1,912,752
RECEIVER
Filed April 26, 1929
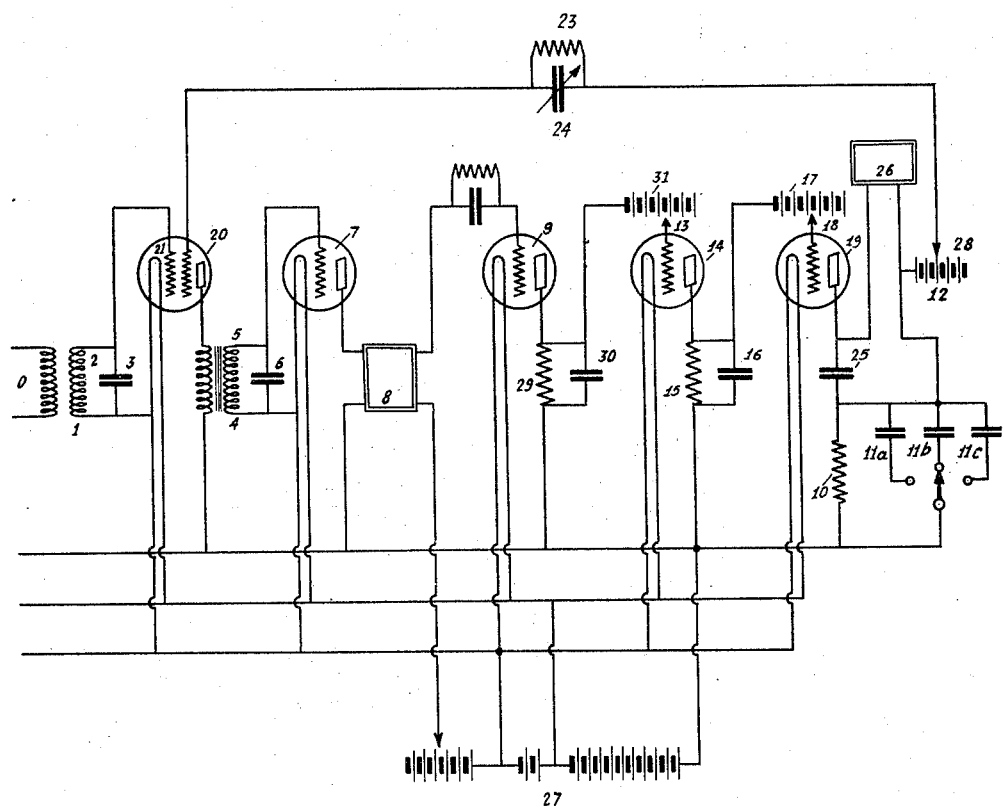
INVENTOR
JOSEPH BETHENOD
BY
ATTORNEY Patented June 6, 1933

1,912,752

UNITED STATES PATENT OFFICE

JOSEPH BETHENOD, OF PARIS, FRANCE

RECEIVER

Application filed April 26, 1929, Serial No. 358,310, and in France April 26, 1928.

This invention relates broadly to improvements in radio broadcast receivers and especially to a system for controlling the signal intensity or volume thereof.

More specifically the present invention is directed to correcting approximately the undesirable changes of amplitude known as fading, in receivers, wherein potential variations due to flowing of the detected current in a resistance posterior to the detector, are fed to grids of one or several tubes prior to said detector.

These potential variations change the sensitivity of the receptor in opposite sense to the intensity of received oscillations.

It has already been proposed in U. S. application Serial No. 355,083 of H. J. J. M. de R. de Bellescize, to realize the aim and scope of this invention by means of increasing the time constant of the resistance capacity circuit provided for controlling the sensitivity prior to the detector, in order that changes in signal amplitude, will not cause noticeable potential variations at an extremity of the resistance incorporated in said circuit. That circuit is placed to the end of the receptor, hence energically acting on a unit anterior to the detector.

The present invention has for its object to indicate that the unit placed before the amplifier may be a two-grid tube. The potential variations created in the resistance passed by the detected current are fed to the outer grid of the tube, across a polarization source and, a regulable condenser shunted by a resistance. The incoming oscillations are applied between the inner grid and the cathode of the two-grid tube; the plate is united to the detector, if necessary, by way of any amplifier system, and particularly one or several two-grid tubes comprising the foregoing arrangements. In this way, the sensitivity of that amplification can be regulated prior to detection in accordance with the strength of the detected signal.

It is moreover possible to transpose or exchange the parts played by the inner and outer grid by a suitable choice of the polarization potentials in series in the lead brought to the resistance passed by the detected current.

The invention will be more easily understood by referring to the drawing which shows a single preferred embodiment of the invention. This scheme is in its extent, similar to that of Figure 2 in application Serial No. 355,083 already referred to, but varied by using a two-grid tube prior to the detector and connected to a resonant circuit posterior to the detector.

The oscillations flowing to 0 from the antenna excite a resonator 1 comprising the coil 2 and the capacity 3. The said resonator is connected between the inner grid 21 and the cathode of the two-grid tube 20. The plate circuit of that tube transmits the oscillations to the tube 7, from there to the amplifier 8, in fact any amplifier device (frequency-changer, two-grids . . .) from there to the detector tube 9. The low-frequency amplifying unit is provided with stages 14 and 19, connected together and with the prior stages by way of the junction batteries 31 and 17. The indicating or registrating apparatus is shown generally as 26. The circuit with a high time constant including a resistance 10 and one of the capacities $11_a$, $11_b$, $11_c$, interchangeable by means of a commutator device, is placed to end of receptor and disjoined from the plate of the last tube by a high frequency blocking condenser 25.

The polarization battery 12 with a variable tap 28 is connected to said circuit. The tap is united to the outer grid of the bigrid tube 20 across a regulable condenser 24 shunted by a resistance 23.

The batteries 27 feed filament, grids and plates of the system.

I claim:

A receiving circuit comprising a radio frequency amplifier including a multi-grid tube, a detecting circuit coupled to said radio frequency amplifier and an audio frequency amplifier coupled to said detecting circuit, an indicator device coupled to the output of said audio frequency amplifier, a circuit having a relatively high time constant comprising a resistance and a capacity adapted to have a current proportional in intensity to the intensity of the detected current flow therethrough for causing variations of potential across said resistance in accordance with the intensity of the detected current and a connection including a capacity and a source of current in series between said high time constant circuit and one of the grids of said tube for varying the sensitivity of said radio frequency amplifier in accordance with said potential variations set up across said resistance and means for impressing incoming signal currents upon another grid of said tube.

JOSEPH BETHENOD.